: 3,494,780
Patented Feb. 10, 1970

3,494,780
METHOD FOR ENHANCING PERMEABILITY OF SEPARATORY MEMBRANES
William Eugene Skiens, Concord, Calif., assignor to The Dow Chemical Company, Midland, Mich., a corporation of Delaware
No Drawing. Filed Nov. 4, 1966, Ser. No. 591,961
Int. Cl. B44d 1/09, 1/44; C08j 1/38
U.S. Cl. 117—63                                    8 Claims

ABSTRACT OF THE DISCLOSURE

A method for greatly improving the selectivity and permeability of cellulose ester membranes is disclosed which comprises treating the membrane with a solution of a plasticizer for the cellulose ester and a secondary additive which is capable of forming a solution with the plasticizer and which is a poor plasticizer for and a nonsolvent for the membrane. The secondary additive may be water or an organic hydroxyl containing compound.

---

The present invention relates to an improved method for the manufacture of permeable membranes.

Permeable membranes have been developed in a variety of shapes such as flat membranes, tubular membranes as discussed in U.S. 2,411,238, and the more recently developed permeselective hollow fiber membranes as discussed in 3,228,876 and 3,228,877.

A diversity of membranes are known which, to various degrees, have the property of being selectively permeable to different components of fluid mixtures. Thus, some membranes will pass water while restraining ions, other membranes will selectively pass ions in solution. Still other membranes possess selective permeation rates for two or more non-ionic components of fluid mixtures. Additional types of membranes are the so-called molecular sieve type, such as those used for dialysis. These latter type of membranes can oftentimes pass ions or other materials but tend to restrain passage of high molecular weight components or are adapted to pass only certain molecular weight fractions of given materials, depending on actual molecular size and proportions thereof.

It is often difficult, however, to tailor a membrane having the permeselectivity necessary for a given separation. Frequently the permeability behavior of a membrane may be unsatisfactory, inefficient and furthermore, highly unpredicable. It would be advantageous, for example, to be able to consistently provide a permeable membrane having high efficiency in passing fluids and low molecular weight compounds while restraining higher molecular weight materials, for instance, one which could be utilized in an artificial kidney structure which would have high water and urea permeability (clearance) but would not allow the passage of high molecular weight protein material (i.e., albumin, etc.). On the other hand, and in other instances, it would be of advantage to tailor a membrane so that it has high water permeability and would not permit passage of relatively low molecular weight materials such as common salt, i.e., so that it has high salt rejection.

It is frequently encountered that there are significant differences between the efficiency or selectivity of a separatory membrane even when the same polymeric material is used to make the membrane, but different methods of manufacture of the membrane are employed. Thus, many of the suitable membrane forming materials are susceptible to being fabricated into a membrane shape by wet, dry or melt casting or extrusion. Each of these techniques has its advantages and disadvantages. With wet spinning, for instance, among the disadvantages is the relative slow speed at which wet spinning permits the manufacture of such structures. Also, there is a general tendency for dry (i.e., solvent-polymer solutions) or even wet extruded membranes to have rough and irregular surfaces which are inclined toward pin holes, obviously reducing the efficiency of the separation and the life of the membrane. Additionally, it is usually required that wet extruded membranes must be dried before they can be efficiently and effectively potted or sealed in a separatory seal, and as a result of the drying, it is quite frequently observed that the permeation properties are undesirably or unacceptably low. On the other hand, wet and dry extrusion lends itself well to fabricating membranes from heat sensitive polymer compositions. Melt extrusion of separatory membranes is a preferred method of manufacturing separatory membranes because of the relative speed at which such membranes can be fabricated and the regularity and uniformity of the resulting product. In the case of hollow fiber membranes, it is especially advantageous to ultilize melt spinning techniques since hollow fiber membranes of excellent uniformity having small diameters and extremely thin walls can be produced at high speeds.

Accordingly, it is among the chief objects and primary concerns of this invention to provied a means for preparing and modifying permeable membranes of a synthetic thermoplastic polymeric material so that they are selectively permeable or have enhanced selective permeation properties and are capable of providing excellent transfer rates and effecting excellent separations and purifications in separatory processes.

It is a further object to provide a means for preparing permeable separatory membranes that are particularly well suited for dialysis type separations.

The foregoing and additional objects and cognate benefits and advantages are accomplished in and by practice of the present invention which comprises, providing a membrane of a film-forming cellulose ester and treating the membrance with a solution of a plasticizing compound for the cellulose ester and a secondary additive, different from the plasticizing compound, and which is not a solvent for the cellulose ester and is a poor plasticizer for the cellulose ester, for example, a polyol, ethanol or water. By a "poor plasticizer" is intended those materials that would not be considered by the artisan to be a plasticizer for the cellulose esters. However, in a strictly academic or theoretical sense many of such materials could be said to have a slight swelling or plasticizing influence on cellulose esters. For instance, water will swell slightly some cellulose esters but it would not be a plasticizer in the traditional sense, i.e., a material which would, in relatively minor amounts, lower the melting point of the cellulose ester for instance.

While it may not be essential, it is highly advantageous if the membrane, before treating according to the present invention, is in a plasticized condition, i.e., containing a plasticizer distributed throughout the membrane as would result if the membrane is extruded from a plasticized mass of the cellulose ester. Ordinarily, such plasticized compositions are melt extruded into the desired membrane shape. In such cases, the amount of the plasticizer that is employed should be enough to suitably plastify the cellulose ester such that when the composition is subjected to a melt extrusion operation the mass will have a melting point lower than that of the unplasticized cellulose ester. The amount of the plasticizer in addition should be enough to provide an easily and efficiently melt extrudable composition. However, it is to be understood that the present invention is useful for treating a membrane from any source, i.e., whether it is melt, dry or wet extruded and whether the membrane has been first leached or dried free of any plasticizing or the like ingredient.

In the treating solution that is employed in the practice of the present invention, the amount of the plasticizing compound employed should be sufficient to provide sufficient swelling of the membrane structure. The amount of the secondary additive that is incorporated with the plasticizing compound will depend somewhat on the history of the membrane and its composition, as well as the final desired properties of the membrane. For instance, to obtain a highly permeable membrane that has high permeability to water and low molecular weight materials (one that would be useful as an artificial kidney membrane or for general dialysis), the membrane preferably will be treated with a solution of a plasticizing compound and a polyol, e.g., tetramethylene sulfone and polyethylene glycol. Whereas, when a membrane having high water permeability but low or zero permeability to low molecular weight materials such as NaCl (i.e., high salt rejection) useful for water desalination, then preferably the membrane will be treated with a solution of a plasticizing compound (e.g., tetramethylene sulfone) and water.

The plasticizing compound and the secondary additive should be compatible with one another in order to produce a homogeneous solution or blend. Advantageously and beneficially, these two components are water soluble, however, this is not essential insofar as they may be leachable with a solvent (such as ethanol) which can be subsequently leached or replaced with water, i.e., the solvent being water soluble.

The permeability membranes that are prepared according to the present invention are highly efficient and provide excellent separatory membranes. When dialysis type membranes are thus prepared these have permeation properties frequently equally as good and often better than the conventional dialysis membranes prepared from regenerated cellulose, while at the same time having many other advantages over such regenerated cellulose membranes, for instance higher mechanical strength.

The important feature of the present invention is the treating of the membrane with the solution of the combined secondary additive and the plasticizing compound. For example, treating the membrane with a combined solution of a polyol and sulfolane compound will usually provide membranes with a water permeability on the order of 15 to 20 times higher than that obtained with membranes treated with an equal amount of the sulfolane compound alone. On the other hand, the secondary additives contemplated in the present practice, e.g., polyols, are normally very poor if at all plasticizers or swelling agents for the cellulose esters and when used alone, they are not able to provide the permeation properties desired.

The plasticizers or plasticizing compounds used in the present treatment can be any of those that first of all, of course, plasticize the cellulose ester, and are compatible with the treating solution. For example, such materials include dimethyl sulfoxide, dimethyl formamide, butyrolactone, N-methyl formamide, dimethyl acetamide, caprolactam, 2-pyrrolidone, malonitrile, triacetin, tetramethylene sulfone (frequently referred to as sulfolane) and ring substituted derivatives thereof such as 2,4-dimethylsulfolane, 3-sulfolanyl acetate, etc.

Beneficially and preferably, the plasticizer for the cellulose ester that is employed in the treating solution according to the practice of the present invention is a sulfolane compound and particularly tetramethylene sulfone (which in the art is itself frequently referred to as "sulfolane") and ring-substituted derivatives thereof such as 3-ol esters and ethers as discussed in U.S. 2,219,006 and U.S. 2,451,299. Preferably, those sulfolane compounds that are employed in the present invention are represented by the structural formula:

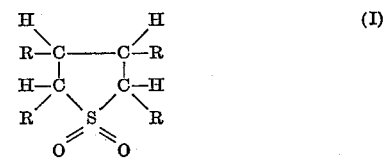

(I)

wherein R represents hydrogen or a methyl radical. Advantageously and preferably, as mentioned, sulfolane is employed, i.e., with reference to Formula I where each R is hydrogen.

The secondary additives that are added with the plasticizing compound in the membrane treating solutions are generally those having hydroxyl groups and having a molecular weight up to about 4,000 or so. The particular one chosen will depend on the acetyl content of the polymer and should be one that will form a solution with the plasticizing compound. Exemplary of some of the secondary additives that can be employed are water, methanol, ethanol and such alcohols when high salt rejection membranes are desired. When dialysis type membranes are desired polyols are preferably employed and include such materials as ethylene glycol, diethylene glycol, tirethylene glycol, tetraethylene glycol, etc., and including propylene glycol, dipropylene glycol, etc. and mixtures of ethylene and propylene glycol units and such other polyols as glycerine and the like. Advantageously and beneficially, the secondary additives which are polyols having a molecular weight up to about 2,000 are used in the practice of the present invention.

The particular additive (including the molecular weight thereof) will depend, as indicated, on the type of membrane required, i.e., dialysis or salt rejecting, for example, and the particular cellulose ester of the membrane. For instance, in treating cellulose triacetate to perfect it as a dialysis membrane, it is frequently observed that the permeability properties of the resultant membrane increase very rapidly and dramatically as the molecular weight of the polyol increases from about 106 up to about 2000 or so and then tend to decrease at about the same rate up to about 4000 or so. Polyols of molecular weight greater than about 5000 become increasingly incompatible with some more highly esterified cellulose esters such that no or very little enhancement in permeation properties is observed.

The treating solution of the mixture of the plasticizing compound and secondary additive will vary in concentration of the respective ingredients depending upon the particular plasticizing compound and secondary additive as well as the particular cellulose ester in the membrane and the condition of the membrane, e.g., the degree of swelling and the like. Generally, and by way of example, small amounts of a polyol will provide improved results in the permeation properties of the membranes treated. When a dialysis membrane is desired, and further by way of example, when a treating solution of a sulfolane compound and a polyol is employed, solutions with a weight ratio of sulfolane compound to polyol of from about 0.15:1 to about 2.3:1 and preferably from about 0.4:1 to about 1:1 are preferred.

On the other hand, when a desalination membrane is required (high salt rejection), a solution of about 25–60 weight percent sulfolane and 75–40 weight percent water may be beneficially employed.

The time the membrane is treated with the solution is not critical and is usually gauged to be commensurate with required time to obtain the requisite permeation properties. This may be a matter of a few minutes up to several hours.

Treating temperatures are frequently observed to have a surprising influence on the results that are obtained. For example, it is often observed that a 2-to-3 fold increase in water permeability may result when the membranes are treated with the solutions at 25° C. over results obtained when treated at 50° C. Ordinarily, these temperatures should range from about 0° to 100° C., and preferably from about 20° to 40° C.

The cellulose esters that are employed in the manufacture of the membranes are of the film-forming variety and include such materials as cellulose organic acid esters including mono-, di-, and tri-acetates, cellulose propionate, cellulose butyrate, cellulose acetate propionate, cellulose acetate butyrate, etc. and mixtures thereof.

The present invention is adapted to treat membranes that are extruded by known techniques into a variety of shapes and that may be required for any particular separatory device or system. For example, a film or sheet of the material may be treated, or tubes and, of particular advantage, fine filamentary hollow fibers, i.e., having a hollow continuous fluid conducting core.

The membrane treatment of the present invention can be carried out by any convenient means such as by passing the fibers through a bath of the treating solution, or by semi-batch immersion of a spool or roll of the collected membrane. The membrane can be, on the other hand, stored until it is desirable or convenient that it be fabricated into a suitable separatory apparatus and treated at that time. Alternatively, the membrane can actually be installed in a separatory cell or apparatus and the treatment carried out on the membrane after installation. If the membrane is one that is prepared from a plasticized cellulose ester composition, beneficial results can be obtained by treating the mebrane while it still contains the plasticizer. If the plasticizer is leached before the membrane is treated according to the invention, it is desirable to maintain the membrane in a wet or immersed in an aqueous medium until treated with the present treating solutions. Also, it is desirable to keep the membrane in a wet condition after treatment according to the present invention before it is put in operation as a separatory membrane.

Exceptionally excellent results are obtained when the cellulose ester is plasticized and extruded according to the procedure described in my copending application having Ser. No. 591,992 and filed on Nov. 4, 1966. The membranes extruded according to those teachings can be directly soaked or immersed in the treating solutions following the present teaching.

The following examples will serve to further exemplify the present invention, wherein all parts and percentages are by weight unless otherwise indicated.

EXAMPLE 1

Cellulose triacetate (43.6% acetyl) was blended with a 15:1 mixture (by weight) of tetramethylene sulfone: polyethylene glycol (having a molecular weight of about 200). The weight ratio of the combined tetramethylene sulfone and polyethylene glycol to cellulose triacetate was about 0.4:1. The plasticized mass was molded into a membrane film at a temperature of about 250° C. The film was removed from the mold and immersed in a solution of a 1:1 mixture (by weight) of tetramethylene sulfone:polyethylene glycol (having a molecular weight of about 200) and maintained therein at about 25° C. for about 4 hours. The membrane was removed from this bath and washed with water at 50° C. for about ½ hour. The membrane was then tested to determine its water permeability and salt permeability properties. This was accomplished by mounting the membrane in a test cell using an aqueous sodium chloride solution. It was found that the water permeability of the membrane was about 6 to 7 times greater than that of a commercial dialysis tubing (regenerated cellulose). Additionally, no salt was restrained by the membrane, the salt freely flowing through the membrane.

Water permeabilities a hundred-fold less result if membranes prepared in the identical manner of Example 1 are not post treated according to the instant invention.

EXAMPLE 2

A membrane film was cast from a polymer solution containing 10% cellulose triacetate (acetyl content 43.6%), 2.8% tetramethylene sulfone and the remainder methylene dichloride. The membrane after casting and air drying was treated by soaking in a solution containing 50% tetramethylene sulfone in water at 25° C. for 10 minutes. The membrane was then removed from the treating bath and washed in 60° C. water for ½ hour. The water permeability of this membrane was 5–7 times better than a membrane prepared from the above polymer solution but without the sulfolane-water bath treatment. The salt rejection of both the treated and untreated membranes was about 97.8%.

EXAMPLE 3

A membrane film was cast from a polymer solution containing 10% cellulose diacetate (38.3% acetyl—40 second ASTM falling ball viscosity), 2.4% tetramethylene sulfone and 0.2% polyethylene glycol (average molecular weight 1450) and the remainder acetone. The film after casting was air dried a sufficient time to allow the acetone to evaporate. The membrane was then treated in a bath containing 50% tetramethylene sulfolane and 50% polyethylene glycol (average molecular weight 1450) at 25° C. for 1 hour. The membrane was then leached for ½ hour in water at 60° C. The water permeability was found to be equivalent to that of commercial dialysis membranes (i.e., regenerated cellulose) under similar test conditions. No salt was restrained by the membrane, the salt flowing freely through the membrane.

What is claimed is:

1. The method for modifying the permeability properties of a separatory membrane of a film forming cellulose ester which comprises treating the membrane with a solution of (a) a plasticizing compound for the cellulose ester, and (b) a secondary additive capable of forming a solution with the plasticizing compound and which is not a solvent for and which is a poor plasticizer for the cellulose ester, wherein said additive is water or an organic hydroxyl containing compound having a molecular weight up to about 4000 and wherein the weight ratio of plasticizer to said additive ranges from about 0.15/1 to about 2.3/1, and substantially leaching the treated membrane.

2. The method of claim 1, wherein said plasticizing compound is a sulfolane compound selected from tetramethylene sulfone and ring-substituted derivatives thereof.

3. The method of claim 1, wherein said secondary additive is a polyol.

4. The method of claim 1, wherein said secondary additive is a polyethylene glycol.

5. The method of claim 1, wherein said membrane contains a plasticizer therefor.

6. The method of claim 1, wherein said solution is maintained at a temperature of from about 0 to 100° C.

7. The method of claim 1, wherein the temperature of said solution is maintained between about 20 and 40° C.

8. The method of claim 1, wherein said cellulose ester is cellulose triacetate, said plasticizing compound is tetramethylene sulfone and said secondary additive is a polyethylene glycol having a molecular weight up to about 2,000.

References Cited

UNITED STATES PATENTS

| | | | |
|---|---|---|---|
| 2,460,233 | 1/1949 | Morris et al. | 106—176 X |
| 2,279,339 | 4/1942 | Peters | 117—144 |
| 2,861,039 | 11/1958 | Steinmann | 210—22 X |
| 2,894,289 | 7/1959 | Harper et al. | 264—49 |
| 3,086,835 | 4/1963 | Rapoport et al. | 117—144 |
| 3,133,132 | 5/1964 | Loeb et al. | 264—49 |
| 3,140,256 | 7/1964 | Martin et al. | 210—500 X |
| 3,250,701 | 5/1966 | Watson et al. | 264—49 X |
| 3,283,042 | 11/1966 | Loeb et al. | 264—49 |
| 3,285,765 | 11/1966 | Cannon | 264—49 X |
| 3,344,214 | 9/1967 | Manjikian et al. | 264—41 |

OTHER REFERENCES

Principles of Desalination by Spiegler, "Hyperfiltration," Academic Press, pp. 383–391; 1966.

First International Symposium on Water Desalination "Improvement in Fabrication for Reverse Osmosis Desalination Membranes," by Manjikian et al., Department of the Interior, Oct. 3–9, 1965, Washington D.C., pp. 1, 6, 8, 9, 13, 17.

Research and Development Progress Report No. 69 for Office of Saline Water, Dept. of the Interior, by Monsanto Boston Laboratories.

"Investigation and Preparation of Polymer Films to Improve the Separation of Water and Salts in Saline Water Conversion, December 1962, pp. 6, 7, 26, 52, 53, 58 and 59.

WILLIAM D. MARTIN, Primary Examiner

W. R. TRENOR, Assistant Examiner

U.S. Cl. X.R.

117—144; 264—41, 217